Feb. 21, 1939. R. A. GALE 2,148,016
APPARATUS AND METHOD FOR CONVERTING STARCH
Filed May 20, 1937 2 Sheets-Sheet 1

INVENTOR.
Rowland A. Gale
BY
Darby & Darby
ATTORNEYS

Feb. 21, 1939.  R. A. GALE  2,148,016
APPARATUS AND METHOD FOR CONVERTING STARCH
Filed May 20, 1937  2 Sheets-Sheet 2

INVENTOR
Rowland A. Gale
BY Danby & Danby
ATTORNEYS

Patented Feb. 21, 1939

2,148,016

UNITED STATES PATENT OFFICE 2,148,016

APPARATUS AND METHOD FOR CONVERTING STARCH

Rowland A. Gale, New York, N. Y.

Application May 20, 1937, Serial No. 143,689

8 Claims. (Cl. 127—28)

This invention relates to improvements in apparatus and continuous methods for converting starch and similar materials.

The detailed objects of this invention will be apparent from the following description when taken in connection with the attached drawings.

This invention resides substantially in the combination, construction, arrangement, relative location of parts, steps, and series of steps, all in accordance with this disclosure.

In the accompanying drawings,

Figure 3 is a cross-sectional view taken on the line 3—3 of Figure 1.

Figure 1:
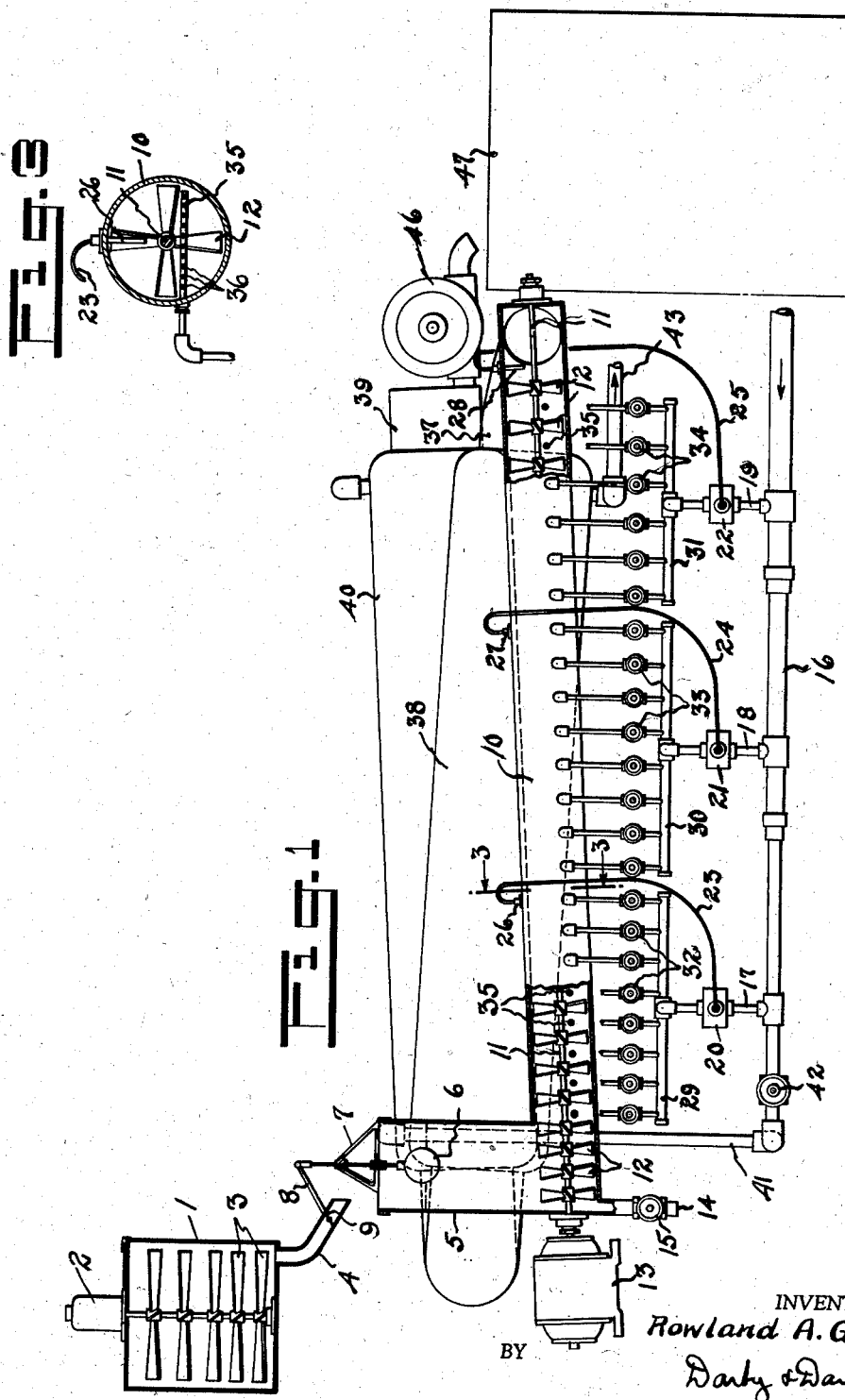
Figure 1 is a side elevational view with some parts in section of an apparatus suitable for practicing the method herein disclosed.
Figure 2:
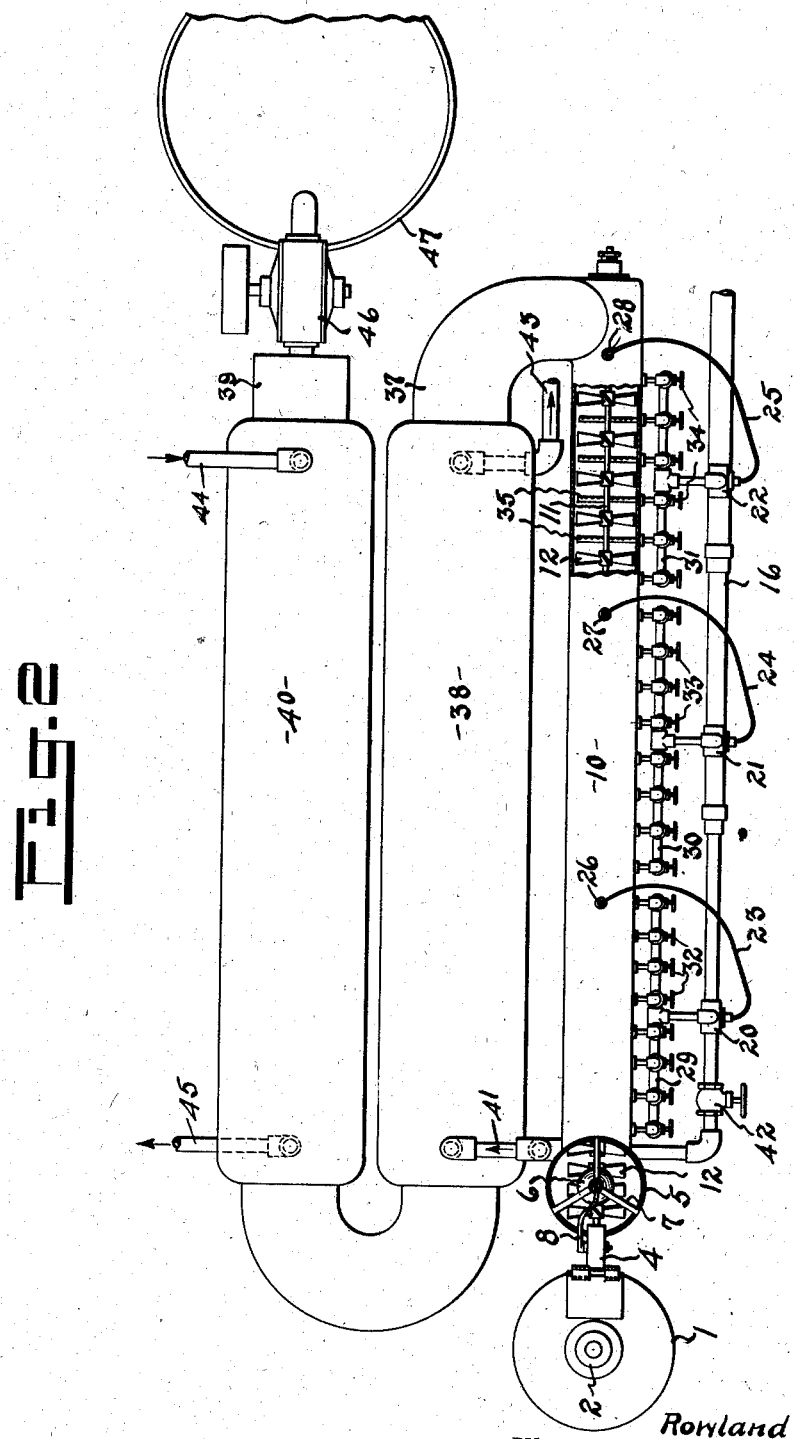
Figure 2 is a top plan view thereof with some parts broken away.

In accordance with present practice, the cooking, digesting or converting of aqueous suspensions of starch and similar materials for use in the manufacture of textiles, paper, adhesives, food products, beverages, and the like, is accomplished in several ways. These methods, which may be termed batch methods, have a number of undesirable inherent characteristics which in a general sense it is the object of this invention to obviate.

In accordance with one commonly employed method, starch, together with an enzyme, or other converting agent, is mixed in cold water in a large tub or vat. The contents are then heated to the desired temperature to permit the digestive action to proceed, which when completed is arrested either by the addition of chemicals or an increase in temperature in the batch. A second method, often employed, consists in pouring a mixture of starch, with the addition of an enzyme or other converting agent, and cold water into a tank of water, the temperature of which is maintained as rigidly as possible at the point required for digestion.

Aside from the fact that both methods are batch methods, there are additional undesired characteristics which will now be explained. In the conversion of starch by the first method, the temperature is gradually raised by the introduction of steam into the vat. Considerable time is required to raise the temperature of a large batch of this type to the desired reacting point, with the result that portions of the batch reach that temperature ahead of other portions so that conversion or digestion of some of the particles begins before others reach the gelatinizing point. In addition, some of the granules naturally gelatinize more rapidly than others and are, consequently, acted upon by the enzymes or other converting agent sooner and for a longer period of time than are the less easily gelatinized particles. At or near the gelatinizing temperature a considerable amount of starch is unavoidably converted by the converting agent to sugar or dextrine. For many purposes conversion of starch to sugar and dextrine is undesirable and this objection is overcome to a considerable degree by the second method of cooking mentioned above.

The difficulty with the second method is found in maintaining the temperature of the hot water into which the cold mixture is poured. In the first place, the starch mixture must be added slowly so as to permit the first portions added to liquefy or thin out and to allow for a continuous readjustment of the temperature. As with the first method, part of the starch is unavoidably acted upon, as will be obvious, for a longer period of time than those parts which are subsequently added. It is apparent that by either method it is impossible to convert starch, with or without enzymes, so that all granules are acted upon equally for the same period of time and at the same temperature.

Aside from the variations in the treatment of different portions of the same batch, it is also quite clear that as between different batches considerable difficulty is encountered, as a practical matter, in producing continuously a uniform product.

An object of this invention is to eliminate the batch method of conversion and to replace it by a continuous process in which the individual particles or granules are acted upon to the same extent to produce a uniform product.

A further object of this invention is to provide a new form of apparatus and a method by means of which aqueous starch suspensions can be converted at concentrations much higher than is possible with the batch method. This is of considerable, practical importance because the cost of drying converted starch of high concentrations is much less.

Before describing the process of this invention in detail, reference will be made to the drawings wherein there is illustrated more or less diagrammatically an improved form of apparatus suitable for carrying out the continuous method hereof. At 1 is shown the mixing tank in which the water suspenson is prepared. It is provided with a series of mixing paddles or beaters 3 which are rotated by means of a motor 2. From the bottom of the tank 1 extends a discharge spout 4 positioned so as to deliver the cold water suspension of starch into a receptacle 5. The level of the water suspension may be maintained in the receptacle 5 by reason of a float 6 which is supported for vertical movement in a bracket 7 mounted on the top of the receptacle 5 and connected at its upper end by means of a link 8 to a valve 9 in the discharge spout 4.

The receptacle 5 forms part of a tunnel or tube 10 which, as is clear from Figure 1, is not horizontal but has a slight incline upwardly away from the receptacle 5. Journaled in this tube is a shaft 11, upon which is mounted a series of beaters and propellers 12 which are constructed of a form as indicated so as not only to act to maintain the mixture uniform but to advance it towards the uphill end of the tube. A motor 13 is connected to the shaft 11 to effect rotation of the paddles. At the low point of the tube 10 is a discharge outlet 14 provided with a valve 15.

At 16 is a steam supply line provided with the branches 17, 18 and 19, in which are connected the automatic valves 20, 21 and 22, respectively. At 26, 27 and 28 are temperature responsive devices, such as thermostatic bulbs, which are connected by the pipes 23, 24 and 25, respectively, to the valves 20, 21 and 22. As will be apparent to those skilled in the art, this provides an automatic method of controlling the steam flowing through the branches 17, 18 and 19. For example, the valves 20, 21 and 22 may be of the diaphragm operated type actuated by variations in pressure in the pipes 23, 24 and 25 by and in accordance with variations in temperature in the tunnel through the agency of the thermostatic bulbs 26, 27 and 28. Those skilled in the art will appreciate the diagrammatic nature of this part of the disclosure and that many well known forms of automatic temperature regulated mechanism of this type are known.

The branches 17, 18 and 19 terminate in the headers 29, 30 and 31, each of which is provided with a plurality of subsidiary branches individually provided with the control valves 32, 33 and 34. These subsidiary branches terminate in nozzles or jets 35, as is clear from Figure 3. These nozzles, for example, may consist simply of short lengths of pipe closed at the end and provided with a series of discharge orifices 36, see Figure 3. They are positioned, as shown in Figure 1, along the tube, and through the control action of the valves 32, 33 and 34 steam may be delivered into the tube at any one of a plurality of points to produce desired temperature conditions along the tube.

Connected to the upper end of the tube 10 is another tube 37 which extends back towards the lower end of tube 10 and is inclined upwardly, as is apparent from Figure 1. Surrounding the major portion of the tube 37 is a second tube 38, which tubes together form a jacket into which steam may be introduced to heat the contents of the tube 37. Steam is supplied to this jacket by means of the branch connection 41 and the quantity of steam supplied thereto from the supply line 16 can be controlled by the valve 42. At 43 is the steam discharge connection for the jacket. Tube 37 extends into a third section 39 which inclines upwardly towards its terminal end and which is surrounded by a jacket 40 to provide a double-wall vessel which may be supplied with a heating or cooling medium through the connection 44 and discharged therefrom through the connection 45. The discharge end of the tube 39 is connected to the inlet of a pump 46, the outlet of which discharges into a receptacle 47.

The operation of this apparatus to carry out the method of this invention will be explained in connection with a typical example. A cold water mixture of starch, either with or without added enzymes or other converting agents, is prepared in the vat 1 and the solid particles are maintained in suspension by the continuous rotation of the beater paddles 2. A portion of the vat's contents is discharged into the receptacle 5 until the level is such that valve 9 is closed by the float 6. Motor 3 is running so that the mixing and propelling blades 12 are rotating. This causes the material to gradually advance to the right, up through tube 10, at a rate depending upon the speed of rotation of the paddles 12, their pitch, and the size of the tube 10 with respect thereto. Steam is delivered into the batch through the nozzles 35 connected to the branch 17. It may be assumed, for example, that it is desired to raise the temperature of the mixture in this part of the tube to, say, a temperature of 180° F. and that the material is travelling through the tube at a rate that it will take it three minutes to travel through this portion thereof. By the time the material reaches the next section of the tube heated by the nozzles connected to the branch 18, the temperature of the material will have reached 180° F. The attainment of and maintenance of this temperature is assured by the presence of the bulbs 26 and its control over the valve 20. Let it be assumed that the material then progresses through the next section in the region of the nozzles connected to the branch 18 while being maintained at a temperature of 180° F. This condition is ensured by the presence of the thermostatic bulb 27 at the end of this section. If it is then desired to rapidly raise the temperature in the third section to 210° F. this is accomplished by the proper setting of valve 22 which is maintained by the thermostatic bulb 28. It will, of course, be apparent that the attainment of these temperatures may be arrived at in accordance with other time-temperature curves, depending upon the setting of the valves 20, 21, 22, 32, 33 and 34.

By the time the material reaches the end of the tube 10, it will have attained a consistency or liquefaction such that it will readily be forced through the tubes 37 and 39 where it may be further treated, depending upon the result desired. For example, in passing through the tube 37 the temperature of the material may be controlled either by raising or lowering it by the control of the supply of heating medium to the jacket 38. The processing may be further continued in the tube 39 or, in those cases where the batch has been completely converted in tube 37, or 38, action, particularly in the case where enzymes are employed, may be arrested by supplying a heating medium, such as steam to the jacket 40. The material is then discharged into the tank 47 aided by the presence of the pump 46.

An important feature of this invention is that there is provided a continuous method of starch conversion, the rate of supply of which may be readily controlled so that the converted starch will be supplied at the rate at which it is used. By controlling the variable factors which directly affect the time-temperature curve of the material under treatment, it is apparent that all manner of conversion methods may be carried out in accordance with practical requirements and continuously.

A very important advantage of this method is that substantially all of the starch particles are subjected to uniform treating conditions and the temperature throughout the starch suspension at the different stages is practically uniform and arrived at at substantially the same time. The presence of the blades or paddles 12 ensures a continuous agitation of the mixture while advancing it, and the distribution of the large number of steam nozzles along the path of travel of the material ensures a rapid and uniform heating of any particular cross-section of the batch.

It is believed that the advantages of the apparatus and methods of this invention will be emphasized by illustrating with examples the wide range of variations in the process made possible:

*Example of back filling mixture for cotton cloth*

| | Parts by weight |
|---|---|
| Starch | 25.0 |
| Talc | 15.0 |
| Colored pigment | 4.5 |
| Diastatic preparation | 0.5 |
| Water | 55.0 |

For such a mixture the steam controls and the rate of flow of mixture through the machine, are adjusted to raise the temperature thereof to 180° F. in three minutes, then to raise the temperature to 205° F. in six minutes and to maintain that temperature for an additional six minutes. The result of this treatment is a rather viscous, converted starch suitable for example for back sizing or back filling, suitable for the treatment of shade cloth, carpets and the like. In the conversion of suspensions of such high concentrations the tubes 37 and 38 of the apparatus may be equipped with mechanical conveyors similar to that shown in connection with the tube 10 in which circumstance it is preferable to eliminate the pump 46.

The following is an example of a sizing material suitable for the surface sizing of paper:

| | Parts by weight |
|---|---|
| Tapioca flour | 10.0 |
| Diastatic preparation | 0.1 |
| Water | 89.9 |

The steam controls and the rate of flow of the mixture through the apparatus are adjusted so as to raise the temperature of the mixture to 170° F. in three minutes, then to 205° F. in six minutes, and to maintain this temperature for an additional six minutes.

The following is an example of a very heavy adhesive for laminating or carton sealing:

| | Parts by weight |
|---|---|
| Tapioca starch | 48.0 |
| Diastatic preparation | 2.0 |
| Water | 50.0 |

In this case the steam controls and the rate of flow of the mixture are adjusted so that its temperature is raised to 165° F. in three minutes, maintaining this temperature for six minutes and then rapidly raising the temperature to 205° F. and maintaining it for six minutes.

The final example is that of a size for paper:

| | Parts by weight |
|---|---|
| Corn starch | 4.0 |
| Diastatic preparation | 0.1 |
| Water | 95.9 |

This mixture is heated to 180° F. in three minutes, then heated rapidly to 205° F., held there for six minutes and then cooled in six minutes to 130° F. With the apparatus illustrated the cooling would be effected in the tube 39 by supplying cold water to the jacket 40.

An object of inclining the tubes upwardly is to ensure that they will be filled with the mixture at all times during the operation of the apparatus. In addition it is possible by the introduction of steam, hot water, or the like, at the high end to clean out the apparatus and drain it out at the drain 14.

It is of course apparent to those skilled in the art that the automatic control of the apparatus can be eliminated and the attainment of desired temperature within the tubes can be accomplished by hand regulation of the valves. Those skilled in the art will appreciate that the motor 13 is preferably a variable speed motor to accommodate the apparatus to varying rates of transit of the material through the tube. It is also to be understood that the apparatus and the method are capable of use in starch conversion whether or not enzymes or other chemical converting agents are employed. This apparatus is particularly adapted for the digestion of starch with all the available forms of enzymes and is of particular value because of the ability to readily change the time-temperature curve of the material to accommodate the process to the characteristics of the wide range of enzymes available for these purposes.

I do not, therefore, desire to be strictly limited to the disclosure as given for purposes of illustration but rather to the scope of the appended claims.

What I claim is:

1. A continuous method of converting starch, including the steps of moving an aqueous fluid mixture of starch at a uniform rate through spaced heating stations and applying heat at each station to heat the mixture at these stations to the desired temperatures by injecting steam directly into the mixture while agitating it at each of the stations wherein a minimum of starch is converted to sugars.

2. A continuous method of uniformly treating water suspensions of starch, including the steps of moving a water mixture of starch through a tube at a uniform rate, applying heat to the moving stream by injecting steam thereinto at spaced points in different quantities to raise the temperatures of the stream to different values, and continuously agitating the mixture while heating it to insure a uniform application of heat throughout the mixture.

3. In an apparatus for converting starch, the combination comprising an elongated casing, means in said casing for simultaneously advancing and agitating starch mixtures therealong, and a plurality of individually controlled devices distributed along said casing for discharging steam into the starch as it advances therethrough.

4. In an apparatus for converting starch, the combination comprising an elongated casing, means in said casing for simultaneously advancing therealong and mixing suspensions of starch, a plurality of individually controlled nozzle devices distributed along said casing for discharging steam into the starch as it advances therethrough, and temperature sensitive means controlled by and in accordance with the temperature conditions within the casing for automatically controlling said nozzle devices.

5. In an apparatus for converting starch in water suspensions, comprising an elongated casing composed of a plurality of sections connected end to end, means in the first section for conveying the starch therethrough while agitating it, heating means for the first section comprising a plurality of steam nozzles opening directly thereinto, jackets for the other sections having means for supplying heating or cooling fluids to control the temperatures of the materials as they pass through those sections, and means subject to the temperature conditions in the first section for controlling the supply of steam to the nozzles thereof.

6. A continuous method of treating starch to form a homogeneous paste suitable for sizing textiles, paper and the like, comprising moving a water suspension of starch and a converting agent along a defined path in a stream while agitating it and uniformly heating the mixture, by injecting steam into it, to different desired temperatures at spaced regions in its path of travel.

7. A continuous method of treating starch comprising moving a water suspension thereof along a defined path at a uniform speed while agitating it and uniformly heating the mixture to different desired temperatures at spaced regions in its path of travel by introducing steam directly into the mixture to gelatinize it with a minimum of dextrinization.

8. A continuous method of uniformly treating water suspensions of starch, including the steps of moving a water mixture of ungelatinized starch through a tube at a uniform rate and injecting steam into the moving stream at spaced regions while agitating it to heat the mixture uniformly to different desired temperatures in those regions and for periods of time sufficient to completely gelatinize it with a formation of minimum amounts of sugar.

ROWLAND A. GALE.